T. F. Griffith.
Movable Keel.

Nº 4,016.  Patented Apr. 26, 1845.

UNITED STATES PATENT OFFICE.

THOMAS F. GRIFFITH, OF NEW MARKET, MARYLAND.

IMPROVEMENT IN THE METHOD OF ATTACHING A MOVABLE TO THE STATIONARY KEEL OF A VESSEL.

Specification forming part of Letters Patent No. 4,016, dated April 26, 1845.

*To all whom it may concern:*

Be it known that I, THOMAS F. GRIFFITH, of New Market, in the county of Dorchester and State of Maryland, have invented a new and Improved Manner of Building Vessels with a Movable Keel; and I do hereby declare that the following is a full and exact description thereof.

The improvement which I have devised in the building of vessels is intended to be applied to those that are meant to navigate creeks or other shoal waters, while they are at the same time furnished with a deep heel, by which they are also fitted for the navigation of bays and of other waters where good sailing properties are required. In its general construction a vessel built upon my plan does not differ from those in common use, having a keel, ribs, and other timbers put together in the usual manner; but I make the main body of the keel movable, so that when the vessel is to navigate waters not sufficiently deep for the draft of the vessel the movable keel may be unshipped and hauled up on one side and may be readily replaced when desired.

Figure 1:
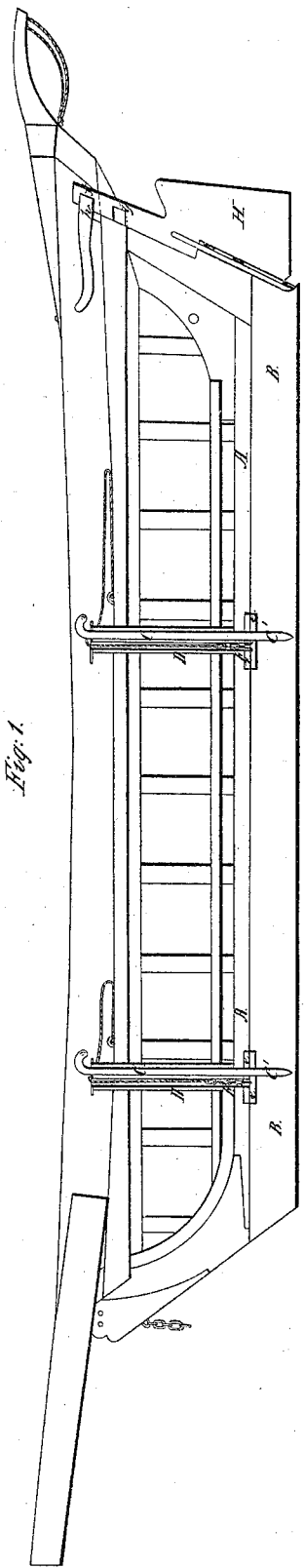
Figure 2:
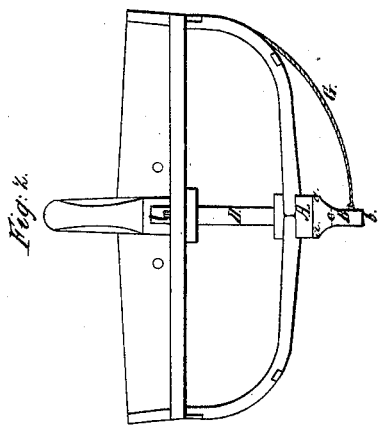

In the accompanying drawings, Figure 1 is a vertical section of one of my vessels from stem to stern, and Fig. 2 is a vertical cross-section of the same.

A vessel of this description may of course be varied in its dimensions, but I will for the sake of description give the general size and proportions of one that I am about to construct. This vessel I intend to build fifty feet long in the keel and with a breadth of beam of twenty feet.

A A is the permanent or stationary keel, which may measure fourteen inches from side to side and seven inches in depth, the stem and stern-posts, the ribs, keelson, and other timbers being united to this permanent keel in the usual way.

B B is the movable keel, the form of which is best seen in the cross-section, Fig. 2. This keel may measure fourteen inches from side to side at $a\,a$, where it fits onto the stationary keel. From this line I intend to give a depth of two feet, a thickness of five inches at its lower part $b$, and of six inches at $c$, where it begins to widen out.

C C are iron bolts, say of two inches in diameter, which pass through vertical stanchions or posts D D. These posts extend up from the keel and pass through the deck of the vessel, and there are two holes bored through them from end to end, one of which is to receive the bolts C C, while a chain F F is to pass through the other for a purpose to be presently shown. The lower end C' of each of the bolts is to extend nearly through the keel, and they should be well fitted to the holes bored to receive them. For the sake of lightness these bolts may be lessened in diameter—say to one inch—toward their upper ends. The stanchions or posts D D may be of timber measuring about six by ten inches. Of these I have shown two only, which are supposed to be placed near to the masts, but a greater number may be used.

F F are chains, the lower ends of which are attached firmly to the movable keel B.

In the drawings, ropes are represented as attached to the chains F F; but I intend to use chains of the whole length necessary to the management of the movable keel and of a size to fit while they pass freely through the holes bored for them.

$e\,e$ are plates of iron attached to the stationary and the movable keels where the bolts and chains pass through them. Two or more ropes G are attached to the movable keel, by which it may be drawn up above the water-line or close to the gunwale on one side of the vessel, when it is disengaged from the stationary keel by the withdrawing of the bolts C C. The rudder H is so hung that it may slide up and down to the distance of the width of the movable keel, its pintles being constructed in such manner as to admit of this motion. There are two mortises $f$ and $g$ in the rudder-post to admit the tiller $h$, according to the situation of the movable keel.

When it becomes necessary from the shoalness of the water, the movable keel may be unshipped, all that is necessary for this purpose being to withdraw the bolts C C and to loosen and slack off the chains F F. The keel may then be hauled up by means of the ropes G G and lashed or otherwise made fast to the gunwale. Should a vessel thus constructed ground at any time while the movable keel is in place she will be immediately relieved by unshipping the keel. The movable keel should be just heavy enough to sink in water, and it will in this case be shipped and unshipped with the utmost facility. When in place, the chains F F are to be keyed up taut by wedges passed through their links on the tops of the posts D D.

A vessel of the dimensions herein described will draw from five to six feet of water, and although capable of being navigated in shallow waters it will have a depth of keel which will adapt it to safe and ready navigation in a rough sea.

To those acquainted with the sliding or shifting keels which have been heretofore used, the superiority of my movable keel, made to ship and unship, will be manifest, not only in the great width which may be given to it, but in its not interfering with the manner of constructing, with the strength, or with the room for storage in the holds of vessels to which it is applied.

Having thus fully described the nature of my improvement in building vessels and shown the manner in which the same is carried into operation, what I claim therein as new, and desire to secure by Letters Patent, is—

The manner of attaching a movable to a stationary keel and of shipping and unshipping the same by means of bolts and chains, substantially as herein set forth.

THOMAS F. GRIFFITH.

Witnessses:
   THOS. P. JONES,
   EDWIN L. BRUNDAGE.